Patented Oct. 18, 1932

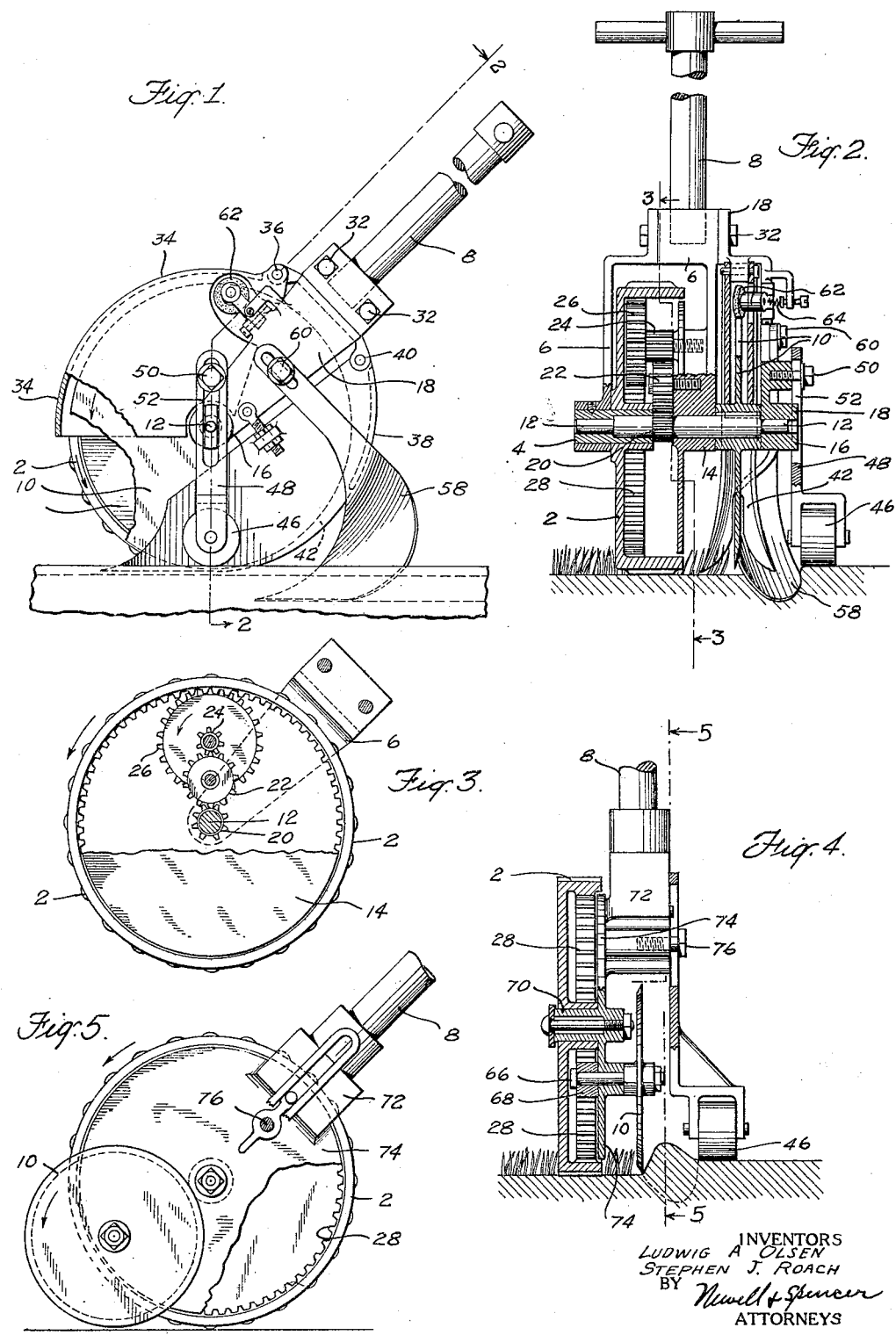

1,883,817

UNITED STATES PATENT OFFICE

LUDWIG A. OLSEN AND STEPHEN J. ROACH, OF BROOKLYN, NEW YORK

LAWN EDGE TRIMMER

Application filed May 27, 1929. Serial No. 366,176.

This invention relates to grass cutting devices and particularly to devices for trimming the edges of lawns, walks, flower beds and the like.

In trimming lawns one of the most troublesome and tedious operations is to keep the edges of walks and flower beds looking neat and straight and to cut off overhanging grass. This work is ordinarily done by hand with a pair of shears which requires the gardener to work on his hands and knees taking much time and care. Very often small trenches are dug along these edges for drainage purposes and to prevent dirt from being thrown or swept up onto the grass.

It is an object of the present invention to provide a device which will trim the edge of a lawn and effectively cut the unsightly horizontal growth which spreads from the edge and which lies too low to be caught in the blades of an ordinary lawn mower and cannot be cut by known tools, with the exception of hand operated shears.

Numerous lawn edge trimmers have been suggested prior to my invention and some have been sold and used, but none has been adapted satisfactorily to cut this horizontal growth. The prior art alternatives have been to cut away a strip of the sod or to trim the horizontal growth by slow and tedious hand work.

I have now discovered that it is possible by use of a novel device to trim this horizontal growth rapidly and easily so as to leave a neat uniform edge and regardless of whether or not a strip of the sod is removed.

These and other important objects and features of the invention will appear from the following description of the preferred forms of the invention illustrated in the figures of the drawing, in which—

Figure 1 is a side view of a preferred form of the invention with certain parts broken away;

Figure 2 is a vertical sectional view taken on the line 2—2 of Figure 1;

Figure 3 is a vertical sectional view of the device taken on the line 3—3 of Figure 2;

Figure 4 is a vertical sectional view similar to Figure 2 illustrating a modified form of the invention; and Figure 5 is a vertical sectional view taken on the line 5—5 of Figure 4.

In the form of the invention illustrated in Figures 1, 2 and 3 of the drawing the device comprises a ground wheel 2 mounted to rotate upon the cylindrical bushing 4 carried by the frame 6 to which the handle 8 is secured. A cutting element in the form of a vertically positioned disk 10 with a sharp cutting edge is keyed to a shaft 12 mounted parallel to and concentric with the ground wheel 2 and driven from the same as the cutter is moved along the edge to be trimmed. The cutter 10 is of substantially the same diameter as the ground wheel 2 and its cutting edge is positioned to cut the grass without coming in contact with the soil over which the cutter is passed.

The shaft 12 to which the cutter 10 is secured is mounted to rotate in the bearing 14 in the frame 6 and the bearing 16 in the detachable frame member 18. The cutter 10 is driven at a speed in excess of that at which the ground wheel is rotated by means of the gear 20 secured to the shaft 12 and meshing with the gear 22 which in turn is driven by a pinion 24 secured to the gear 26 which meshes with gear teeth 28 formed on the inner surface of the periphery of the ground wheel 2.

The detachable frame member 18 is secured to the frame 6 by bolts 32 which may easily be removed for making repairs or adjustments or to remove the cutter 10. A guard is carried by the frame member and extends around the upper portion of the cutter to protect it from injury and as a safeguard for the operator. The upper portion 34 of the guard is pivotally secured to the frame member 18 by the hinge 36 to permit access to the blade to remove the same for repairs or replacement. The lower portion 38 of the guard is also secured to the frame 18 by a hinge 40 for a similar purpose. The lower part of the guard portion 38 is preferably provided with a slot 42 aligned with the cutter 10 but, as shown by the dotted lines in Fig. 1, the blade is protected by the guard from contact with the ground beneath the slot 42. It will be readily appreciated that this slot 42 may be entirely omitted and the periphery of the guard section made to completely cover the lower part of cutting disk.

The cutting of the grass, etc., is effected at 80 where the grass is lifted against the cutting edge of the disk 10 by the upper edge of the guard section 38. This guard section 38 is brought to a point at 81 as shown in Fig. 1 and this point serves at once to turn aside stones or other obstructions which might otherwise dull the blade and to get under the horizontal growth and lift it into contact with the rotating blade 10. This point 81 also cooperates with the bottom of the upper guard section 34 to prevent the exposed cutting edge of the blade 21 from contacting with the ground in any position of the trimming device. The upper edge of the lower guard section 38 conforms rather closely to the sides of the blade 10 between the cutting position 80 and the edge 40. The bottom, however, may advantageously be flared somewhat more than the top from the point 81 to the section as shown in Fig. 2. This flare serves to push aside stones or other objects which would tend to dull the blade if brought into contact with its cutting edge. The slot 42 preferably divides the point 81 so as to make two separated points which act in the manner just described. When the bottom of the guard section 38 is flared, for example as shown in Fig. 2, it may be open as in Fig. 2 in order that cuttings and any other material which may be carried by the edge of the guard section at 80 will be allowed to drop back on to the ground and will not collect within the guard section so as to interfere with the unobstructed rotation of the cutting disk.

A guide wheel 46 is carried by a member 48 which is adjustably secured to the frame member 18 by means of a bolt 50 which passes through the slot 52 in the member 48. This guide roller can be moved vertically to hold the frame and cutter in the desired position as it is moved along the edge of a path or flower bed, the surface of which may be either higher or lower than that of the ground over which the ground wheel 2 and the cutter 10 pass.

If it is desired to dig a small trench along the edge of a sidewalk between the paving and the grass or around the edges of flower beds, a small plow-like member 58 may be adjustably secured to the frame 18 and extends below the ground wheel 2 and cutter 10 directly behind the cutter to dig such a trench and throw the dirt onto the sidewalk or flower bed along the edge of which the cutter is passed. The member 58 is adjustable to vary the depth of the trench which is cut and may be readily removed by unscrewing the bolt 60 when it is not desired to cut such a trench.

Since the efficient operation of my novel trimmer depends upon the grass being cut, as distinguished from shearing or tearing as in all of the prior art devices of which I am aware, it is important that the cutting blade be kept sharp at all times. Accordingly I prefer to provide a sharpening device 62 carried by the frame 18 which in the present embodiment is located near the edge of the cutting blade and extends through the guard portion 34 and into engagement with the cutting edge of the cutter 10. The sharpening device may be held in engagement with the cutting edge of the disk by a spring 64 adjustable to vary the pressure applied to the sharpening device as desired.

In the form of the invention illustrated in Figures 4 and 5 the device is modified in some respects, the cutter 10 being relatively small and located eccentrically of the ground wheel 2. The cutter 10 is keyed to the shaft 66 and driven by the pinion 68 secured to the shaft and meshing directly with the gear teeth 28 on the inner surface of the ground wheel 2. In this form of the device the ground wheel 2 is mounted upon the cylindrical bushing 70 carried by the frame member 72 which is provided with a circular portion 74 for enclosing the gears. The guide wheel 46 is secured to the frame 72 by the bolt 76 and is adjustable as in the form of the device illustrated in Figures 1, 2 and 3. Advantageously, a guard may be employed for the cutter used in this form of the device and may be carried by the frame 72. The trench cutting device and sharpening device may also be used with this form of the invention but are omitted from the drawing for the purposes of simplicity.

In using either form of the device it is only necessary to move the cutter along the edge to be trimmed and the extremities of the lower portion of the guard raise the grass into engagement with the rapidly rotating cutter to trim off the ends of the grass and produce a sharp, neat edge. At the same time the trench cutting device cuts a small trench of uniform size along the edge of the grass to give the lawn or walk a sharply defined edge with an attractive and finished appearance.

The cutter 10 may be carried by the frame and driven from the ground wheel of a hand or power operated lawn mower in order to trim the edge of the lawn at the same time that the grass is being cut. When so used the device may be raised out of engagement with the grass when cutting all but the edges of the lawn. Although the cutter is shown as driven by the ground wheel it may be driven by any other suitable means and the driving mechanism itself may consist of a belt or other device instead of gears as shown.

The invention is capable of numerous other modifications and changes in the construction and arrangement of parts and therefore it is not intended that the invention should be limited to the specific forms illustrated and described except as defined by the claim.

What is claimed as new is:

A grass cutting device comprising a frame having a handle extending therefrom, a ground wheel rotatably secured to said frame and having an internal gear thereon, a pinion driven by said ground wheel through the internal gear and rotatably secured to said frame, a second pinion fixed to an axle rotatably secured to said frame and journaled within the pivot of said ground wheel, the second pinion being driven from the ground wheel through the first pinion at a speed greater than that of the ground wheel, a circular cutting disk of diameter slightly less than that of the ground wheel fixed to said axle so as to be rotated by the ground wheel acting through said pinions, a guard covering the cutting edge of said disk except adjacent its cutting position integral extensions on the guard adjacent said cutting position adapted to be pushed under horizontally disposed plants and when so pushed to lift them into engagement with the cutting edge of said blade, and an adjustable guide member secured to said frame on the opposite side of the cutting disk from the ground wheel and adapted to control the distance above the ground of the cutting edge of said disk.

Signed at New York, New York, this 17th day of May, 1929.

LUDWIG A. OLSEN.
STEPHEN J. ROACH.